United States Patent

[11] 3,627,993

[72] Inventor Irving B. Cooper, Jr.
Marblehead, Mass.

[21] Appl. No. 878,369
[22] Filed Nov. 20, 1969
[45] Patented Dec. 14, 1971
[73] Assignee Notifier Company
Lincoln, Nebr.

[54] CONTROL SYSTEM
7 Claims, 4 Drawing Figs.

[52] U.S. Cl. .......... 235/61.11 H, 235/61.7 B, 235/61.9 R, 340/149 A
[51] Int. Cl. .......... G06k 7/08, H04q 1/30, G06k 7/00
[50] Field of Search .......... 235/61.11, 61.116, 61.114, 61.11 C, 61.11 H, 61.7 B, 61.9 R; 340/149 A, 171.4

[56] References Cited

UNITED STATES PATENTS

| | | | |
|---|---|---|---|
| 2,980,319 | 4/1961 | Clemens | 234/30 |
| 3,015,087 | 12/1961 | O'Gorman | 340/149 A |
| 3,422,252 | 1/1969 | Cooper | 235/61.11 |
| 3,453,598 | 7/1969 | Schweizer | 340/149 A |
| 3,508,031 | 4/1970 | Cooper | 235/61.11 |
| 3,530,281 | 9/1970 | Smeiman | 235/61.11 |

*Primary Examiner*—Maynard R. Wilbur
*Assistant Examiner*—Robert M. Kilgore
*Attorney*—Willis M. Ertman

ABSTRACT: A card reader has a card sensing area; a switch adjacent the card sensing area responsive to the insertion of a card into the card sensing area; at least one control sensor and a plurality of data sensors in the sensing area; first circuitry responsive to the operation of the switch in response to the insertion of a card in the sensing area for applying a pulse to the control sensor, the control sensor producing an output signal in the presence of a copper disc on the card disposed adjacent the control sensor; second circuitry, including a solid-state switch, responsive to the output signal of the control sensor for interrogating the data sensors; and readout circuitry responsive to the output signals of the data sensors as a function of indicia on the car for generating data signals for application to an output device.

CONTROL SYSTEM

SUMMARY OF INVENTION

This invention relates to control systems and, more particularly, to a latching circuit for such systems that employ an article such as a card having information recorded thereon and a sensor device having a plurality of sensing elements for reading the information recorded on the article.

In some systems the information is printed on cards in a logical configuration and the cards must be inserted into a card reader with the proper orientation in order to furnish a meaningful output, for example the readout on a printer. Existing devices of this type use cards each having a clipped corner to insure that all cards are correctly oriented, thus requiring the additional expense of a clipping operating in their preparation.

A variety of other systems, such as vending, accounting, and security control systems, frequently use a card or similar record as a control element. In such a system, a card bearing a particular arrangement of indicia is utilized with a sensing device to actuate a controlled apparatus or to record the use of an apparatus controlled by the sensing device and/or the identity of the user of that apparatus. The sensing device employed in such systems requires little or no supervision, so that it may be located in an unattended facility. In addition, it should function reliably and require little or no maintenance. Such a sensing system should provide a reasonably high degree of security in order to guard against unauthorized use while providing an arrangement which will not be damaged by attempted unauthorized use..

An object of the invention is to provide a simple, economical, reliable circuit capable of translating information accurately from a card which can be coded so that the card will not be decoded if conductive material is not present in a designated location of the card. A further object of the invention is to provide novel and improved information translating apparatus that facilitates effective coding and transmission of information long distances over simple circuits.

Another object of the invention is to provide novel and improved data translation apparatus arranged to retain the coded information until the readout operation, including the checking of data and operation of authorization devices if desired, is completed.

Another object of the invention is to provide novel and improved card reading apparatus for reading the code on a card and activating a control circuit in response to the code applied to the card without requiring that one of the card corners be clipped to insure proper card orientation.

Still another object of the invention is to provide card reading apparatus which permits the use of compact code forming element arrangements in the cards.

A further object of the invention is to provide novel and improved card reading apparatus which may be located a great distance from a printer without requiring the use of shielded wires in the runs.

A still further object of the invention is to provide novel and improved card reading apparatus which discriminates between different classes of cards and different classes of readers.

According to one aspect of the invention, a card reader has means defining a card sensing area, a switch adjacent the card sensing area responsive to insertion of a card into the sensing area, at least one control sensor and a plurality of data sensors in the sensing area, first circuitry responsive to the operation of the switch in response to the insertion of a card in the sensing area for applying a pulse to the control sensor, the control sensor producing an output signal as a function of an indicium on the card, second circuitry, including a solid-state switch, responsive to the output signal of the control sensor for applying a pulse signal to the data sensors, and readout circuitry responsive to the output signals of the data sensors as a function of indicia on the card for generating data signals for application to an output device.

According to another aspect of the invention a card reader has means defining a card sensing area, a control sensor, a plurality of data sensors, first means adjacent the card sensing area responsive to the insertion of a card into the card sensing area for energizing the control sensor, first circuitry responsive to the control sensor for producing an output signal as a function of an indicium on the card, second circuitry responsive to the first circuitry for energizing the data sensors, and third circuitry for storing output signals from the data sensors as a function of indicia on the card.

In preferred embodiments the card reader also has means responsive to the signal indicative of the insertion of the card for reading out of information from the third circuitry and has further circuitry responsive to a data reset signal generated in response to the completion of the data readout operation for releasing the first circuitry to permit readout of data upon another card.

The control sensor in a particular embodiment includes two electromagnetic devices, each including a primary winding and a secondary winding. One of the electromagnetic devices is disposed in the sensing area so that a card may be interposed between its primary and secondary windings, and the other electromagnetic device is disposed outside of the sensing area. The primary windings of the two electromagnetic devices are connected in parallel and the secondary windings of the two electromagnetic devices are connected in series opposition in the manner that when the sensor primary windings are energized, the secondary windings produce outputs of approximately equal magnitude and of opposite polarity in the absence of an area of electrically conductive material disposed on the card interposed between the primary and secondary windings of the first electromagnetic device and the second circuitry does not respond to the control sensor. When an area of electrically conductive material is disposed on the card interposed between the primary and secondary windings of the first electromagnetic device, the area absorbs the field radiated so that the secondary winding of the first electromagnetic device does not produce a detectable output signal and the output from the secondary winding of the second electromagnetic device energizes the second circuitry.

In a particular embodiment, the data sensors are also electromagnetic devices disposed adjacent the card sensing area and each electromagnetic data sensor device has a primary winding disposed on one side of the sensing area and a secondary winding disposed on the other side of the sensing area in the manner that the card to be sensed may be interposed between the data sensor primary and secondary windings. The second circuitry is arranged to apply a pulse to all the data sensor primary windings simultaneously in response to a control sensor output and to induce a detectable output in each of the data sensor secondary windings in the absence of an electrically conductive data bit carried by the card disposed in the sensing area interposed between each data sensor primary winding and its corresponding data sensor secondary winding. Each electrically conductive data bit which is interposed between a data sensor primary winding and its corresponding data sensor secondary winding absorbs the field radiated by the data sensor primary winding so that the corresponding data sensor secondary winding does not produce a detectable output.

In that embodiment, the first means is a microswitch arranged to be closed by the insertion of the card into the sensing area and to energize the control sensor. The second circuitry includes a first silicon controlled rectifier and a first transistor; the first silicon controlled rectifier is arranged to be energized by the output signal of the control sensor when the electrically conductive control bit is properly positioned and to cause the first transistor to produce a "data in" signal for transmission to a remote device. The second circuitry also includes a second silicon controlled rectifier and a second transistor; the second silicon controlled rectifier is arranged to be energized by the output signal from the first transistor and causes the second transistor to energize the data sensors. The third circuitry includes a third silicon controlled rectifier and a third transistor; the third silicon controlled rectifier being arranged to be energized by outputs from the data sensors and to energize the third transistor to read out information from the third circuitry in response to a data request from the remote device. The second controlled rectifier is connected in a self-releasing circuit; and the first and third controlled rectifiers are connected to be released in response to a signal from the remote device indicating completion of data readout.

Other objects, features and advantages of the invention will become apparent from the following description of a particular embodiment, taken together with the attached drawings thereof, in which.

DESCRIPTION OF PARTICULAR EMBODIMENT

Figures 1, 2, 3, 4:
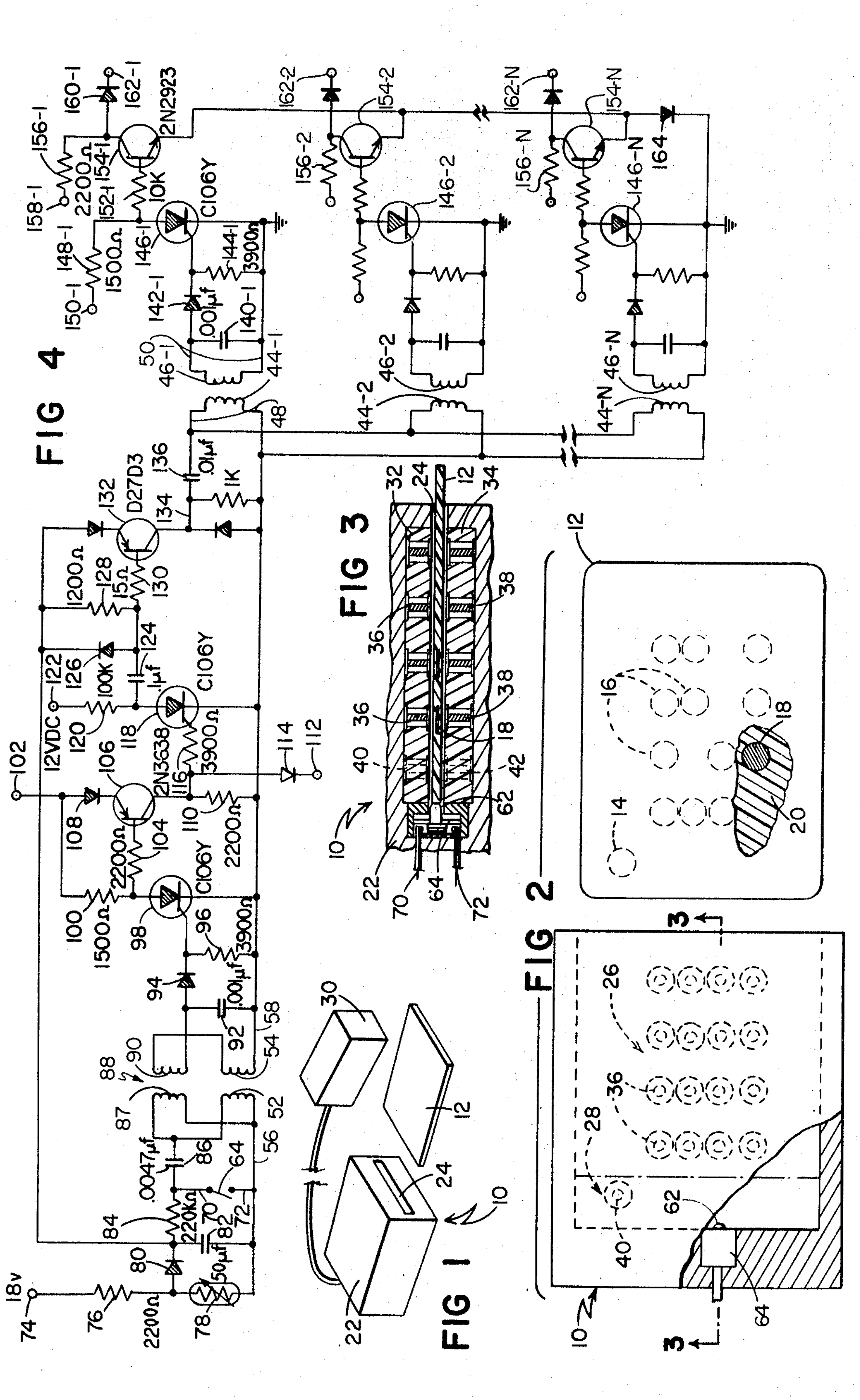
FIG. 1 is a perspective view of card reading apparatus constructed in accordance with the invention and a card designed for use therein.
FIG. 2 is a top view of a portion of the card reader apparatus, with parts broken away, showing details of the card sensing area, and a typical configuration of a card that may be employed with the apparatus.
FIG. 3 is a sectional view of the card reader, taken along line 3—3 of FIG. 2, showing a card inserted therein.
FIG. 4 is an electrical schematic wiring diagram of a portion of the circuitry of card reading apparatus embodying the invention.

With reference to FIGS. 1 and 2, there is shown a card reader structure 10 for use with a card 12. The card has disposed in it a plurality of electrically conductive indicia, including a latch control indicium 14 near one corner of card 12, and a plurality of data positions 16 with data indicia 18 at selected positions, which are used for encoding information. These indicia 14, 18 are electrically conducting members and may be copper discs in the order of 2.5 mils in thickness, or aluminum discs in the order of 0.5 mils in thickness, backed with a lead sheath. In typical applications, it is preferred that the indicia 14, 18, be encased with an opaque material 20 so that their relative positions on the card are not visible to the card user. The sheath is provided to prevent location of the indicia by means of X-raying the card. The card reader 10 includes a housing 22 having a slot 24 disposed in the front wall through which the card may be inserted for positioning in card sensing area 26 that has a control sensing portion 28. Also mounted within housing 22 is electrical control circuitry operated in response to the positioning of a card 12 in the sensing areas. Remote printer 30 is arranged to be operated in response to the insertion of card 12 into slot 22.

Diagrammatic views of the card sensing area are shown in FIGS. 2 and 3. This card sensing area is defined between an upper member 32 and a lower member 34. The upper and lower plastic members 32, 34 are similar in configuration and have aligned apertures in which are disposed electromagnetic flux conductor members in the form of pole pieces 36, 38 in area 26 and 40, 42 in portion 28. In the arrangement shown in FIGS. 2–4, there are 16 data sensors pole pieces 36 and one control sensor pole piece 40 in upper member 32 and, respectively, 16 corresponding data sensor pole pieces 38 and one corresponding pole piece 42 in the lower member 34 so that when the two members 32, 34 are assembled together corresponding pole pieces in each area are aligned with one another. Mounted on the pole pieces 36 are similar primary windings 44 (FIG. 4) and mounted on the pole pieces 38 are secondary windings 46. Leads from the primary windings 44 are brought out of the sensing area structure over conductors 48 and connections from the secondary windings 46 are brought out of the sensing area structure over conductors 50. Similarly, pole pieces 40 and 42 have primary and secondary windings 52, 54, respectively, with corresponding connections brought out over conductors 56 and 58, respectively.

In the rear portion of the card sensing area is card sensor 62, connected to microswitch 64. When the card 12 is inserted in the sensing area, as indicated in FIG. 3, the forward edge of the card acts against sensor 62 to move it rearwardly and operate microswitch 64 to complete an electrical circuit between conductors 70, 72.

As indicated in FIGS. 2 and 3, the primary and secondary winding elements are disposed within recesses in members 32, 34 and it is preferred that those recesses be filled with an epoxy compound or other material such that each member has a smooth inner surface with the ends of the pole pieces 36, 38, and 40, 42 flush with that surface so that no impediment to the card 12 exists in the sensing area and the card may be slid in and out easily and without damage.

Electrical control circuitry for use with this card sensing structure is shown in schematic form in FIG. 4. This circuitry includes terminal 74, to which a +18-volt signal is applied, and which is wired to ground through resistor 76, and thermistor 78.

Connected to the junction between resistor 76 and thermistor 78 is diode 80 and capacitor 82. This circuit provides a rectified output voltage which is applied via resistor 84 to one terminal of microswitch 64 and to capacitor 86. The other terminal of capacitor 86 is connected to primary winding 87 of a reference transformer 88 similar to the control sensor transformer. The secondary winding 90 of the reference transformer 88 is connected in series opposition to the secondary winding 52 of the control sensing transformer and an output from that circuit is coupled through an input circuit including capacitor 92, diode 94, and resistor 96 to the silicon controlled rectifier switch 98. The anode of rectifier 98 is connected through resistor 100 to terminal 102 which has a 12-volt gated signal applied to it and which signal is removed by the printer 30 after data readout has been completed. The anode of switch 98 is also connected through resistor 104 to the base electrode of drive transistor 106. The emitter of transistor 106 is connected through diode 108 to terminal 102 and the collector of that transistor is connected through resistor 110 to ground. The collector is also connected to output line 112 via diode 114 and provides a "data in" signal to printer 30.

Also connected to the collector of transistor 106 via resistor 116 is a second SCR switch 118 that has its anode connected through resistor 120 to a 12 volt DC source at terminal 122. Switch 118 is driven into conduction when transistor 106 conducts, but due to the size of resistor 120 it does not remain in conduction but releases. The transition due to the temporary conduction of switch 118 is coupled by capacitor 124 and the input network of diode 126 and resistors 128 and 130 to the base electrode of transistor 132. Transistor 132 conducts only until capacitor 124 is charged and during that interval generates a pulse over line 134 which is passed through the primary windings 44 of the sensing transformers at data positions 16 via a series resonant circuit which includes capacitor 136 to apply a high frequency signal to those primary windings. In this embodiment this signal is a damped oscillatory signal in which a typical pulse width is in the order of one microsecond.

If sufficient flux is coupled to the secondary winding 46 of a sensing transformer, that winding produces an output which is coupled by the input circuit including capacitor 140, diode 142 and resistor 144 to storage switch 146 The anode of switch 146 is connected through resistor 148 to terminal 150 to which is applied the same 12-volt gated signal as applied at terminal 102 and is also connected through resistor 152 to the base of drive transistor 154 whose collector is connected via resistor 156 to terminal 158 to which the printer 30 applies a 12-volt data request signal in order to provide data readout through diode 160. Diode 164 is provided in the circuit to raise the emitter potential of transistors 154 sufficiently so that each transistor 154 will remain nonconducting in response to the application of the voltage at terminal 158 if switch 146 is conducting.

Terminals 102, 112, 150 and 158 and lines 162 are connected over unshielded lines to a remote device such as a printer 30. The signal applied at terminal 112 when transistor 106 turns on provides a "data in" signal to the remote device. The remote device then provides a voltage at terminal 158 as a readout request; and after the remote device has completed operation, it momentarily removes the voltage from terminals 102 and 150 to reset SCR switches 98 and 146 preparatory for a subsequent operation.

In operation, card 12 is inserted in slot 24 until its forward edge closes microswitch 64. Closure of that switch applies a high frequency pulse (one microsecond pulse width) to the primary windings 52 and 87 of the control sensor and reference transformers. If the card 12 is inserted into slot 24 in the orientation shown in FIG. 2, the latch control element 14 will be disposed between windings 52 and 54, acting as a "shorted turn" and preventing output of a significant pulse from winding 54. Reference transformer secondary winding 90 (which may be outside the card sensing area 26) produces an output pulse which is not cancelled by a corresponding pulse from winding 54 and that pulse is coupled through diode 94 to turn SCR switch 98 and transistor 106 on. A signal is produced at terminal 112 indicating to the remote unit that an appropriate card has been inserted correctly in the card reader. A turn-on transition of transistor 106 is also applied through resistor 116 to turn-on switch 118 and commence charging capacitor 124. Transistor 132 conducts until capacitor 124 is charged and provides a high frequency pulse signal to the primary windings 44 of the data transformers. The secondary winding 46 of each data transformer which does not have a metal element 18 disposed between its primary and secondary windings produces an output pulse sufficient to turn on the corresponding switch 146. The conduction of any switch 146 places a bias on the base electrode of its respective transistor 154 so that that transistor will not conduct when a voltage is applied at terminal 158 in response to a readout request from the remote device. The remote device then samples and records the data sensed by the card reader as indicated by the voltage conditions of the output lines 162. When the remote device has completed operation, it momentarily removes the 12-volt gated signal from terminals 102 and 150 and thus releases rectifiers 98 and 146 in a reset operation.

If card 12 had been inserted improperly, the disc 14 would not have been interposed between windings 52 and 54 when card 12 was inserted in the slot. Winding 54 would produce an output in opposition to the output from winding 90 and switch 98 will not conduct. When a card 12 is properly presented, the circuitry is latched until rectifier 98 is released by removal of the 12-volt signal from terminal 102. This latched condition is indicated by the signal at terminal 112. The circuitry provides a level of discrimination between noise and signal which permits the use of unshielded wires in long runs–up to approximately 3,500 feet–between the card reader and the remote device. The orientation feature of element 14 eliminates the need for an additional operation, such as clipping a corner of the card, in the preparation of the cards since disc 14 may be placed on the card in the same operation in which the data discs 18 are placed thereon.

Further, the card reader will not respond to other types of credit cards such as those made of plastic entirely as the output from the secondary winding 54 of the control transformer will not be inhibited.

It will be obvious that other latch actuator arrangements may be employed. For example, the card may be arranged with metal elements in three of the four corners and a single control transformer employed which would produce an output only when the card is properly oriented. In another embodiment, two or more control transformers may be employed and arranged in a manner to prevent latching of the card reader and sensing of the data in response to insertion of a thin metallic object such as a nail file. Other embodiments will be apparent to those skilled in the art and therefore it is not intended that the invention be limited to the disclosed embodiment or to details thereof and departures may be made therefrom within the spirit and scope of the invention as defined in the claims.

What is claimed is:

1. A card reader comprising means defining a card sensing area, a control sensor, a plurality of data sensors, first means adjacent said card sensing area responsive to the insertion of a card into said sensing area for energizing said control sensor, first circuitry including first latchable solid state switching means responsive to said control sensor for producing an output signal as a function of a first indicium on said card sensed by said control sensor and latching said first solid-state switching means, second circuitry responsive to the output signal of said first circuitry for energizing said data sensors, third circuitry including second latchable solid-state switching means for storing output signals from said data sensors as a function of second indicia on said card and latching said second solid state switching means, means for reading out information from said third circuitry, and fourth circuitry responsive to a data reset signal generated in response to the completion of the data readout operation for releasing said first and second solid-state switching means to permit readout of data on another card.

2. A card reader according to claim 1 wherein said control sensor includes two electromagnetic devices each said electromagnetic device including a primary winding and a secondary winding, the primary winding of one of said electromagnetic devices being disposed on one side of said sensing area and the secondary winding of said one electromagnetic device being disposed on the other side of said sensing area in the manner that said card may be interposed between said primary and secondary windings of said one electromagnetic device, said primary windings of said two electromagnetic devices being connected in parallel to said first means and said secondary windings of said two electromagnetic devices being connected in series opposition in the manner that when said first means energizes said electromagnetic device primary windings, said secondary windings produce outputs of approximately equal magnitude and of opposite polarity in the absence of an area of electrically conductive material disposed on said card interposed between said primary and secondary windings of said one electromagnetic device and said first circuitry does not produce said output signal and that when an area of electrically conductive material disposed on said card is interposed between said primary and secondary windings of said one electromagnetic device, said area absorbs the field radiated by said primary winding of said one electromagnetic device so that said secondary winding of said one electromagnetic device does not produce a detectable output signal and said secondary winding of said second electromagnetic device produces an output signal to energize said first circuitry and produce said output signal.

3. A card reader comprising means defining a card sensing area, a switch adjacent said card sensing area responsive to insertion of a card into said sensing area, first and second electromagnetic devices, each said electromagnetic device having a primary winding and a secondary winding, one of said devices being disposed in said card sensing area, a plurality of data sensors in said sensing area, first circuitry responsive to the operation of said switch in response to the insertion of a card in said sensing area for applying pulse signals of equal magnitude and polarity to said first and second electromagnetic device primary windings, said first and second electromagnetic device secondary windings being connected to produce an output signal as a function of an indicium on said card sensed by said one device, second circuitry responsive to the output signal of said secondary windings for applying a pulse signal to said data sensors, and readout circuitry responsive to the output signals of said data sensors as a function of indicia on said card for generating data signals for application to an output device.

4. The card reader as claimed in claim 3 wherein said second circuitry and said readout circuitry each include a controlled rectifier switch which is latched in conducting condition in response to said output signals, and circuitry responsive to a signal from said output device for releasing said controlled rectifier switches from conducting condition.

5. A card reader arranged to sense an article having discrete areas of electrically conductive material thereon different from other areas of the article comprising means defining a card sensing area, a switch adjacent said card sensing area responsive to insertion of a card into said sensing area, an electromagnetic sensor including a primary winding disposed on one side of said sensing area and a secondary winding on the other side of said sensing area so that an article to be sensed may be interposed between said primary and secondary windings, a plurality of data sensors in said sensing area, first circuitry responsive to the operation of said switch in response to the insertion of a card into said sensing area for applying a pulse to the primary winding of said electromagnetic sensor to induce a detectable output in the secondary winding of said electromagnetic sensor in the absence of electrically conductive material carried by the article disposed in said sensing area interposed between said control sensor primary and secondary windings, an area of electrically conductive material interposed between said electromagnetic sensor primary and secondary windings absorbing the field radiated by said primary winding so that said secondary winding does not produce a detectable output signal, second circuitry responsive to the output signal of said secondary winding for applying a pulse signal to said data sensors, said second circuitry including a solid-state switch arranged to apply a pulse signal to said data sensors only when said electromagnetic sensor secondary winding produces a detectable output, circuitry for latching said solid-state switch when said pulse signal is applied to said data sensors, readout circuitry responsive to the output signals of said data sensors as a function of indicia on said card for generating data signals for application to an output device, and circuitry responsive to a signal from said output device for releasing said solid-state switch.

6. The card reader as claimed in claim 5 wherein said data sensors are electromagnetic sensors disposed adjacent said sensing area, each of said electromagnetic data sensors including a primary winding disposed on one side of said sensing area and a secondary winding disposed on the other side of said sensing area in the manner that said article to be sensed may be interposed between said data sensor primary and secondary windings, said solid-state switch in said second circuitry being arranged to apply a pulse to said data sensor primary windings simultaneously to induce a detectable output in each said data sensor secondary windings in the absence of electrically conductive material carried by said article disposed in said sensing area interposed between each said data sensor primary winding and its corresponding data sensor secondary winding, each said area of electrically conductive material interposed between a data sensor primary winding and its corresponding secondary winding absorbing the field radiated by said data sensor primary winding so that the corresponding data sensor secondary winding does not produce a detectable output signal.

7. The card reader as claimed in claim 6 wherein said second circuitry and said readout circuitry each include a controlled rectifier switch corresponding to each sensor, said controlled rectifier switch in said second circuitry being arranged to be placed in conducting condition in response to a detectable output signal from said electromagnetic sensor secondary winding and each of said controlled rectifier switches in said readout circuitry being arranged to be latched in conducting condition in response to a detectable output signal from the corresponding data sensor secondary winding, said controlled rectifier switches being arranged to be released in response to a signal from said output device.

* * * * *